United States Patent [19]

Greenwood

[11] Patent Number: 4,543,181
[45] Date of Patent: Sep. 24, 1985

[54] MEDIUM CONSISTENCY FLAT DISK PRESSURE SCREEN

[75] Inventor: Brian F. Greenwood, Glens Falls, N.Y.

[73] Assignee: Kamyr, Inc., Glens Falls, N.Y.

[21] Appl. No.: 450,434

[22] Filed: Dec. 16, 1982

[51] Int. Cl.⁴ .............................................. B07B 1/04
[52] U.S. Cl. .................................. 209/273; 209/389; 209/379; 209/358
[58] Field of Search ................ 209/240, 250, 17, 273, 209/268, 271, 262, 358, 379, 380, 384, 385, 389; 210/413-414; 241/73, 70, 69, 46.17, 46.11, 46.06

[56] References Cited

U.S. PATENT DOCUMENTS

| 2,727,441 | 12/1955 | Cram | 209/389 |
|---|---|---|---|
| 3,223,239 | 12/1965 | Dick | 209/273 |
| 3,363,759 | 1/1968 | Clarke-Pounder | 209/273 |
| 3,437,204 | 4/1969 | Clarke-Pounder | 209/273 |
| 3,506,121 | 4/1970 | Holm | |
| 3,547,267 | 12/1970 | Sutherland | 209/240 |
| 3,586,172 | 6/1971 | Young | 209/273 |
| 3,755,072 | 8/1973 | Ostberg et al. | |
| 3,874,509 | 4/1975 | Parker et al. | |
| 3,912,622 | 10/1975 | Bolton, III et al. | 209/273 |
| 3,964,717 | 6/1976 | Hansen | 241/70 |
| 4,036,759 | 7/1977 | Donovan | 210/413 |
| 4,202,761 | 5/1980 | Holz | 209/273 |
| 4,302,327 | 11/1981 | Martin | 209/240 |

FOREIGN PATENT DOCUMENTS

| 949460 | 6/1974 | Canada |  |
| 1102604 | 9/1981 | Canada |  |
| 65105 | 2/1924 | Sweden | 210/413 |
| 7513434 | 11/1975 | Sweden |  |

Primary Examiner—Frank W. Lutter
Assistant Examiner—Wm. Bond
Attorney, Agent, or Firm—Cushman, Darby & Cushman

[57] ABSTRACT

A method and apparatus for screening pulp, or like suspensions, having a consistency of about 6-15 percent. The pulp is passed into a chamber having a flat plate screen, and the pulp is fluidized by rotation of a disk, with vanes, mounted adjacent the screen. The disk may be constructed to allow circulation of rejects within the chamber. The chamber may be in communication with a second chamber having a similar screen and disk arrangement, with the rejects outlet from the second chamber in communication with the suspension inlet to the first chamber.

12 Claims, 4 Drawing Figures

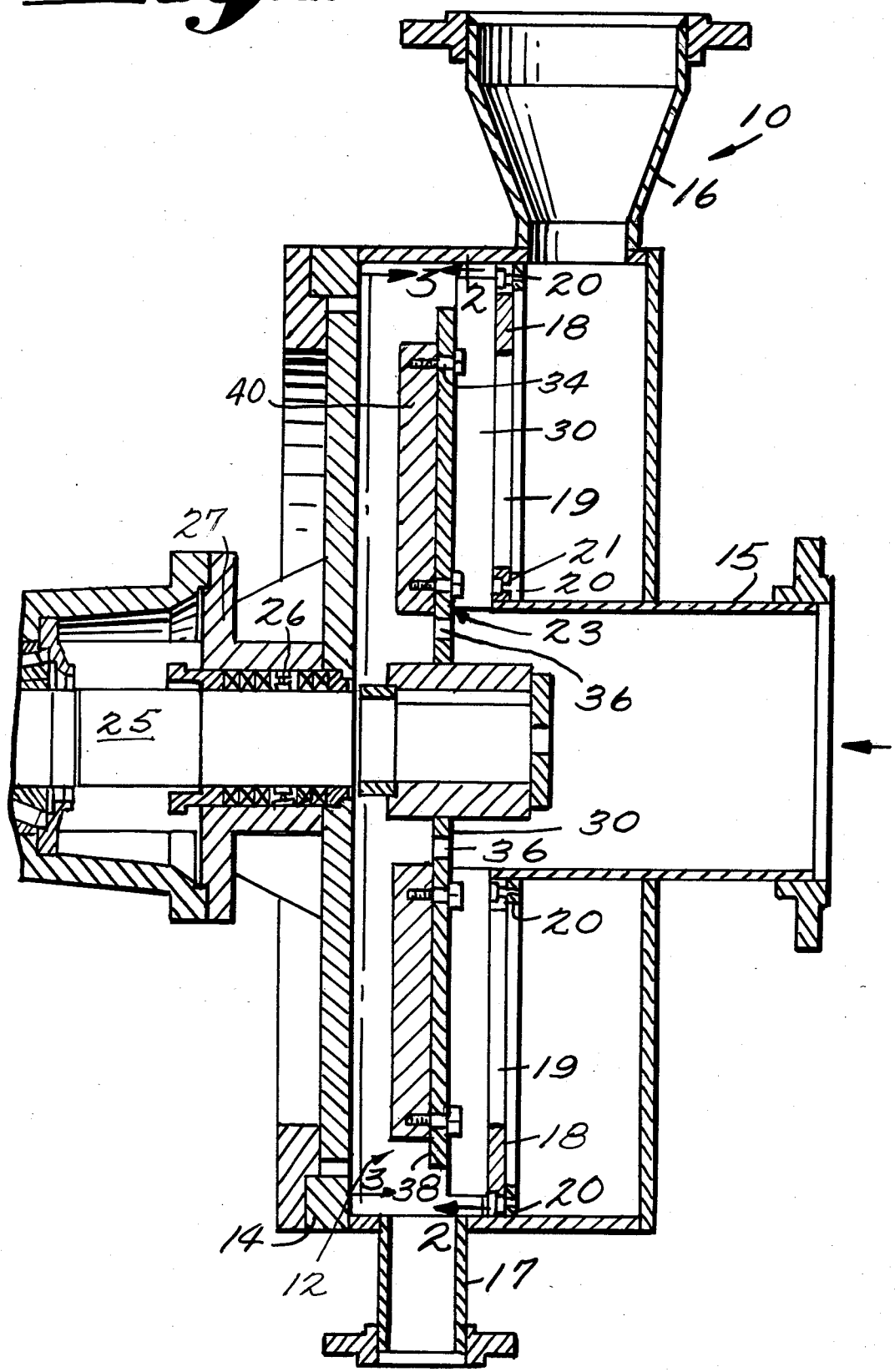

1

MEDIUM CONSISTENCY FLAT DISK PRESSURE SCREEN

BACKGROUND AND SUMMARY OF THE INVENTION

The invention relates to a method and apparatus for effecting screening of medium consistency suspensions, particularly wood pulp stock having a consistency in the range of about 6-15 percent solids. When handling wood pulp stock, it is necessary on some ocassions to remove shives, dirt, and the like from the pulp. It is highly desirable if this screening can be done without dilution of the pulp. Dilution, and subsequent re-thickening, requires additional expensive equipment, and a relatively high energy penalty.

According to the present invention medium consistency wood pulp, and like suspensions, can be screened to remove the shives, dirt, and other reject material therefrom, without the necessity of dilution and then re-thickening. These desirable results can be achieved by utilizing a simple, relatively inexpensive piece of equipment which has long life and effectively performs the screening function.

According to the method of the present invention, screening of a suspension of comminuted cellulosic fibrous material, or a like suspension, having a consistency of about 6-15 percent solids, preferably about 8-14 percent solids, to separate reject material from the suspension is practiced. A substantially flat plate screen mounted in a chamber having a suspension inlet, a suspension outlet on the opposite side of the screen as the suspension inlet, and a rejects outlet is utilized. The method comprises: (a) Passing the suspension into the chamber under pressure. (b) Effecting fluidization of the suspension at the screen area, while maintaining the suspension under pressure. (c) Causing the fluidized suspension to ultimately pass either through the screen to the suspension outlet, or towards the rejects outlet; and (d) Continuously effecting passage of the suspension passing through the screen through the suspension outlet, and the reject material through the rejects outlet.

Fluidization is preferably accomplished by utilizing a disk mounted for rotation adjacent the screen, and rotating the disk at high speed (e.g. 1,500 rpm). The suspension is preferably passed into the chamber along the axis of rotation of the disk, the screen being annular and surrounding the inlet. The outlet for the suspension, and the rejects outlet, may both be radially extending.

A second chamber, with like components, may be provided connected to the first chamber. In such a case, the rejects outlet from the second chamber is provided in communication with the suspension inlet to the first chamber, and the suspension outlet from the first chamber comprises the suspension inlet to the second chamber. A plurality of additional chambers may also be provided if desired.

Exemplary apparatus according to the present invention includes an annular substantially flat plate screen mounted within a closed chamber. An inlet to the chamber is substantially concentric with the screen, and a suspension outlet from the chamber is on the opposite side of the screen from the inlet. A disk comprising first and second faces is mounted so that it is substantially parallel to the screen, and only slightly axially spaced therefrom. The first face of the disk has a plurality of vanes mounted thereon and extending generally radially therefrom, each of the vanes including an end portion disposed radially outwardly from the disk periphery. A rejects outlet extends radially outwardly from the chamber, adjacent the periphery of the disk.

It is often desirable to provide recirculation of a certain amount of the rejects, to reduce the consistency gradient from the suspension inlet to the rejects outlet. This can be done by providing a plurality of openings in the disk adjacent the center thereof, the openings disposed in-line with the suspension inlet. A plurality of impeller blades may be mounted on the second face of the disk, extending generally radially and contained within the periphery of the disk to facilitate recirculation.

It is the primary object of the present invention to provide for the effective removal of shives, dirt, and like reject material from comminuted cellulosic fibrous material suspensions, or the like, of medium consistency. This and other objects of the invention will become clear from an inspection of the detailed description of the invention, and from the appended claims.

BRIEF DESCRIPTION OF THE DRAWINGS

FIG. 1 is a side view, partly in cross-section and partly in elevation, of an exemplary screening apparatus according to the present invention;

DETAILED DESCRIPTION OF THE DRAWINGS

Figure 4:
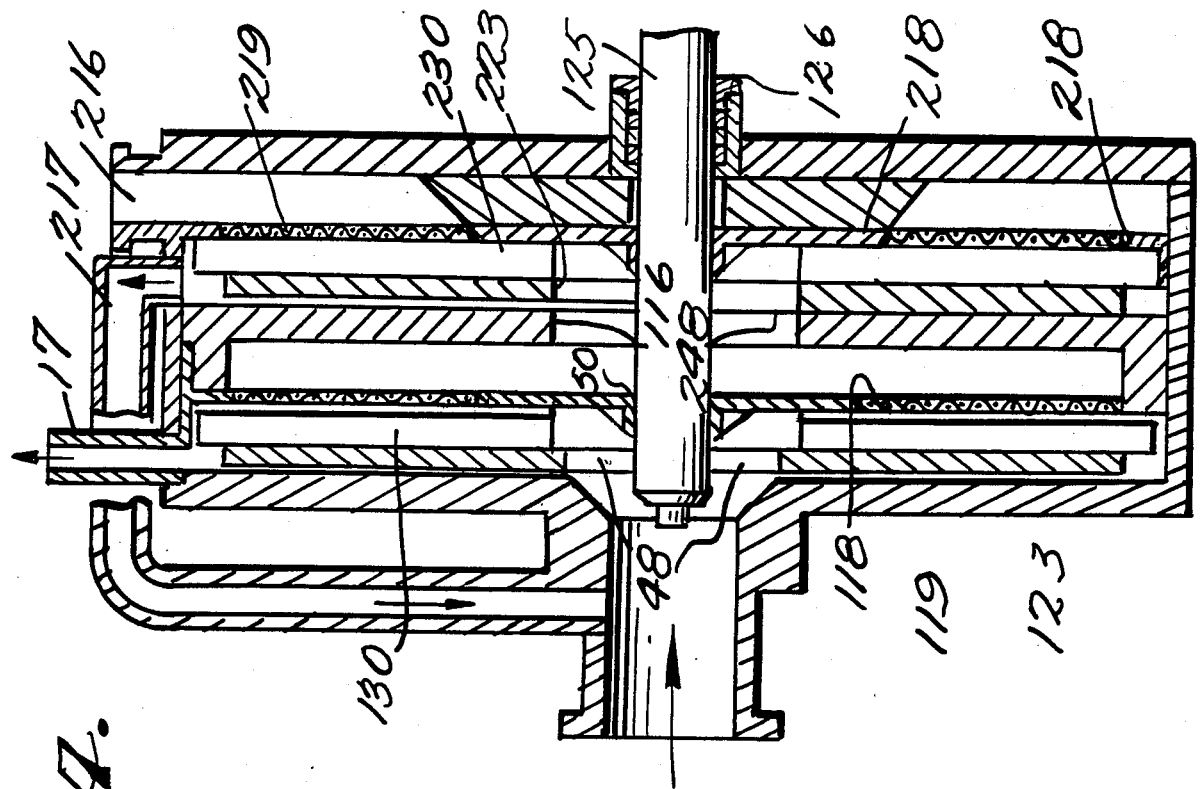
FIG. 4 is a schematic side view, partly in cross-section and partly in elevation, of an exemplary two-stage screening apparatus according to the present invention.

An exemplary screening apparatus according to the present invention is shown generally by reference numeral 10 in FIG. 1. The apparatus 10 includes a screening chamber 12 defined by a housing 14, which housing 14 and chamber 12 are preferably circular in cross-section. A suspension inlet 15 is adapted to provide suspension under pressure to the chamber 12. A suspension outlet 16 extends radially outwardly from the housing 14, and a rejects outlet 17 also extends radially outwardly from the housing 14. The suspension is maintained under pressure within the chamber 12, and this may be facilitated by providing the inlet 15 with a larger cross-sectional area (e.g. 10 inches in diameter) than the combined cross-sectional areas of the suspension outlet 16 (e.g. 4 inches in diameter taping outwardly to an 8 inch diameter) and rejects outlet 17 (e.g. 3 inches in diameter). Back pressure will also be provided by control valves and piping attached to suspension outlet 16, and rejects outlet 17.

Mounted interiorly of the chamber 12 is a substantially flat plate annular screen 18, which may include any of a wide variety of screening apertures. For instance the screening area can be formed by drilled or punched holes, or machined slots, such as the radially extending thin machined slots 19 illustrated in FIG. 1. The screen 18 preferably is constructed so that it can withstand a high pressure difference (e.g. $\Delta P$ 30 psi). Support rings 20, or the like, are preferably stationarily mounted within the chamber 12 (as by welding to the inlet nozzle 15 and the periphery of the housing 14) to provide means for mounting the screen 18. Bolts 21 or the like may be provided to connect the screen 18 to the mounting rings 20, the screen 18 being mounted for ready replacement thereof. The suspension outlet 16 is, of course, on the opposite side of the screen 18 as the suspension inlet 15.

Also mounted within the chamber 12 is a disk 23. The disk 23 is mounted so that it is substantially parallel to the screen 18, preferably so that it is rotatable about an axis comprising the center line of the suspension inlet 15. A shaft 25, bearings 26, and housing mounting collar 27 comprise part of the means for mounting the disk 23 within the chamber 12 for rotation about its axis. Preferably the axis is horizontal, although it may have any of a wide variety of orientations, the operation of the apparatus 10 not being dependent upon orientation with respect to the gravitational force. A conventional power source (not shown) is provided operatively connected to the shaft 25 for effecting high speed rotation of the disk 23 (e.g. 1,500 rpm), the speed of rotation being sufficient to effect fluidization of the suspension being fed to the chamber 12, even though the suspension has a consistency of about 6–15 percent solids.

Figure 2:
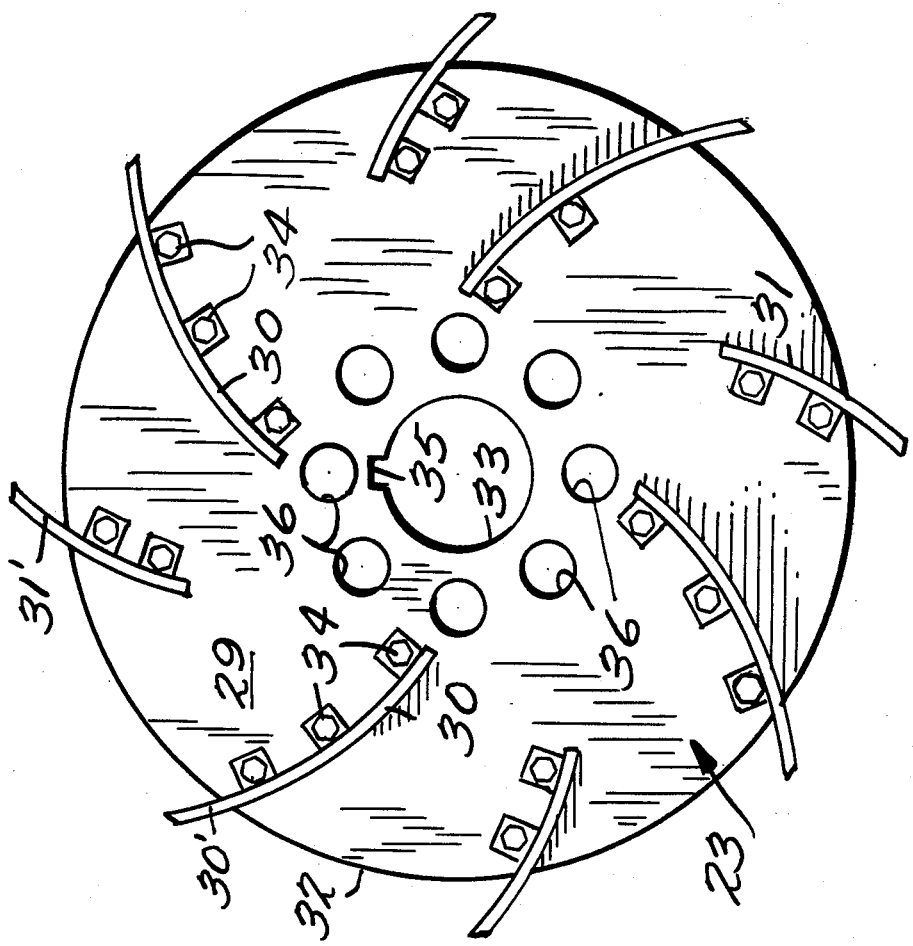
FIG. 2 is a plan view, looking in the direction of arrows 2—2 in FIG. 1, of the rotating disk of the apparatus of FIG. 1.

The disk 23—as best seen in FIG. 2—includes a first face 29, closest to the screen 18, which includes a plurality of vanes 30, 31 mounted thereon. The vanes 30, 31 extend generally radially (preferably, they are arcuate as illustrated), and at least some of the vanes have end portions (see end portions 30', 31' in FIG. 2) which extend radially outwardly from the periphery 32 of the disk 23. Mounting bolts 34 may be provided for mounting the vanes 30, 31 to the face 29. The vanes 30, 31 generate pressure pulsations and/or turbulence in the suspension as it moves between the fixed screen plate 18 and the rotating disk 23, causing some of the suspension to pass through the slots 19 in the screen 18 and then to the suspension outlet 16, and causing other of the suspension material (the rejects) to pass radially outwardly toward the periphery of the housing 14. By extending the portions 30', 31' to essentially the interior periphery of the housing 14, and adjacent the rejects outlet 17, the suspension is maintained fluidized the entire time from the inlet 15 to the rejects outlet 17.

The disk 23 also includes a central aperture 33, with a keyway 35, for receiving the shaft 25 and a key associated with the shaft 25. Also means are provided defining a plurality of openings 36 in a central portion of the disk 23, surrounding the aperture 33. The openings 36 are disposed radially inwardly of the radially inward-most part of the vanes 30, 31. The openings 36 allow recirculation of a certain amount of reject material, as will be further described hereinafter.

Figure 3:
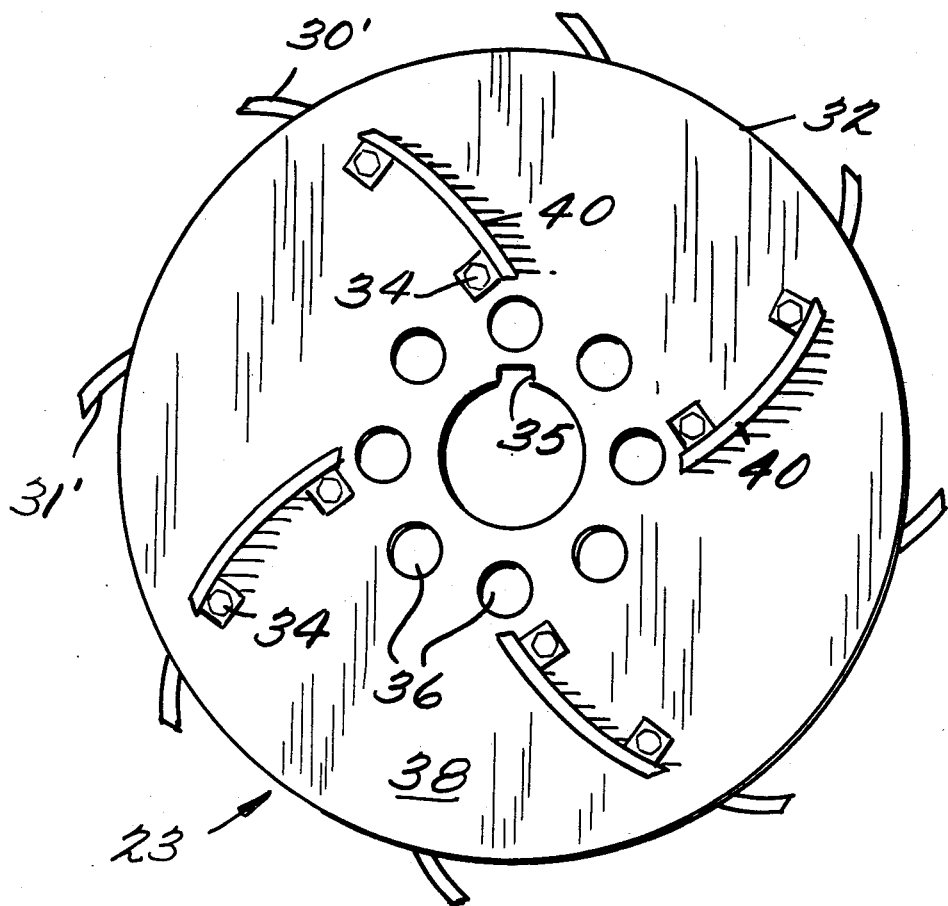
FIG. 3 is a plan view of the disk of FIG. 2 looking at the opposite face thereof (along arrows 3—3 in FIG. 1)

The second face of the disk, 38, opposite the first face 29, is seen most clearly in FIG. 3. This face includes a plurality of generally radially extending impeller blades or vanes 40 mounted thereon. The vanes 40 may be arcuate in much the same manner as the vanes 30, 31, and common mounting bolts 34 may be provided for mounting the blades 40 and vanes 30, if desired. Preferably the blades 40 extend so that they are contained within the periphery 32 of the disk 23, and the radially-most inward portions thereof do not extend as radially-inward as the rejects recirculation openings 36. The impeller blades 40 are fewer in number and/or of less radial extent (compare FIGS. 2 and 3) than vanes 30, 31. Thus a lower pressure is developed on the second face 38 of the disk 23 than on the front face 29, allowing circulation to occur. The impeller blades 40 maintain the zone in which they are disposed in a fluidized unplugged state. The amount of recycle which occurs (i.e. the proportion of the reject material recirculated) is dictated by the number and size of the blades 40 in proportion to the number and size of the vanes 30, 31.

It is possible to screen a suspension having a consistency of about 6–15% since the device according to the invention provides sufficient shear force to fluidize the suspension near the openings of the screen plate 18, while at the same time minimizing the total power consumption of the machine by keeping the fluidized volume low. The provision of the rotating disk, with vanes, mounted in juxtaposition to the screen 18, and in cooperation with the inlet and outlets, keeps the fluidized volume low.

OPERATION OF FIGS. 1-3 EMBODIMENT

In the operation of the apparatus 10 of FIGS. 1 through 3, wood pulp, or a like suspension, having a consistency of about 6–15 percent is fed in the direction of the horizontal arrow in FIG. 1 into suspension inlet 15. The disk 23 is rotating at high speed, and effects fluidization of the pulp, which flows radially outwardly in the chmaber 12, between the screen 18 and the disk 23. The vanes 30, 31 provide pressure pulsations and/or turbulence, causing some of the fluidized pulp to pass through the screen slots 19 and ultimately to the pulp outlet 16, while causing the heavier particles, shives, dirt, and like reject material to be passed radially outwardly (not directly against the screen 18 face), the suspension containing the reject material being maintained in fluidized condition essentially all the way to the rejects outlet 17.

A proportion of the reject material is internally recycled to reduce the consistency gradient from the inlet 15 to the rejects outlet 17. The impeller blades 40 sweep the reject chamber (that area on the opposite side of disk 23 from the inlet 15) to keep the reject zone active and to provide additional head to force the rejects out the outlet 17, and to facilitate some recirculation. Openings 36 allow a proportion of the reject material to pass through the disk 23 to the front face thereof, to be mixed with suspension in inlet 15 and to again pass between the screen 18 and disk 23.

FIG. 4 Embodiment

In the embodiment illustrated in FIG. 4, a pair of screening units according to the present invention are operatively connected together. While only two such units are shown connected together, any number of units may be connected together. In the FIG. 4 embodiment, structures corresponding to the structures in the FIGS. 1 through 3 embodiment are illustrated by the same reference numeral only preceded by a "1", and structures in the second screening unit of the FIG. 4 embodiment are shown by the same reference numerals as those for the first chamber in that embodiment, only preceded by the numeral "2" instead of "1".

In the FIG. 4 embodiment, suspension passes into inlet 115 through open areas defined between spider arms 48 attaching the disk 123 to the rotating shaft 125. Vanes 130 are provided on the face of the disk 123 opposite the inlet 115, with the disk 123 essentially parallel to the screen 118, which screen has screen slots 119 formed therein. The annular screen 118 has an interior bearing arrangement 50 for receipt of the shaft 125, the screen 118 remaining stationary while the shaft 125 rotates with respect thereto. Suspension cannot flow past the bearing means 50, but must flow either through the slots 119 in the screen 118, or through the rejects outlet 117.

The suspension outlet 116 provides the suspension inlet for the next screening chamber, which includes screen 218 having slots 219, disk 223 mounted by spider arms 248 to rotating shaft 125 and having vanes 230 thereon, rejects outlet 217, and suspension outlet 216. The rejects outlet 217 is operatively connected to the inlet 115 of the first screening chamber. If desired, the outlet 216 could be operatively connected to the inlet for a next screening chamber, and the rejects outlet from that next chamber could be connected to the inlet 116 to the second chamber.

It will thus be seen that according to the present invention a simple, yet effective, method and apparatus have been provided for the screening of medium consistency suspensions. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for effecting screening of a suspension, comprising: an annular substantially flat plate screen; a closed chamber; means for stationarily mounting said annular screen within said chamber; an inlet to said chamber substantially concentric with said annular screen; an outlet from said chamber on the opposite side of the said screen from said inlet; a disk comprising first and second faces, said first face having a plurality of vanes mounted thereon and extending generally radially therealong, at least some of said vanes including an end portion disposed raidally outwardly from said disk periphery; means for mounting said disk for rotation in said chamber with said disk substantially parallel to said screen and said vanes spaced a small axial distance from said screen so that said vanes move suspension over said flat plate screen; a rejects outlet extending radially outwardly from said chamber and adjacent the periphery of said disk; means for rotating said disk at a speed sufficient for it to effect fluidization of suspension at the screen area as the suspension is being moved over the screen area by the disk vanes; and the disk being mounted in juxtaposition to the screen, and in cooperation with the inlet and outlets, so that the volume of suspension to be fluidized at the screen area is relatively low; and means for recirculating a portion of reject material from the second face of the disk to the first face thereof, said means comprising means defining a plurality of openings in said disk adjacent the center thereof.

2. Apparatus as recited in claim 1 wherein said openings defined in said disk are in-line with said suspension inlet.

3. Apparatus as recited in claim 2 wherein said openings in said disk are all radially interior of the radially interior-most portions of said vanes.

4. Apparatus as recited in claim 3 further comprising a plurality of impeller blades mounted on the second face of said disk, and extending generally radially, said impeller blades being fewer in number and/or of less radial extent than said vanes.

5. Apparatus as recited in claim 4 wherein said impeller blades are contained within the periphery of said disk.

6. Apparatus as recited in claim 5 wherein said openings in said disk are radially inward of the radially inward-most portions of said impeller blades.

7. Apparatus as recited in claim 1 wherein said chamber comprises a first chamber, said screen comprises a first screen, and said disk comprises a first disk; and further comprising: a second chamber; a second substantially flat plate screen; means for mounting said second screen within said second chamber, substantially parallel to said first screen; said suspension outlet from said first chamber comprising a suspension inlet to said second chamber; a suspension outlet from said second chamber; a rejects outlet from said second chamber, said rejects outlet in communication with said suspension inlet to said first chamber; and means for mounting said second disk so that it is substantially parallel to said second screen and adjacent said second screen.

8. Apparatus as recited in claim 1 wherein said screen is substantially vertical, and wherein the axis of rotation of said disk is substantially horizontal, and wherein the inlet has a cross-sectional area larger than the combined cross-sectional areas of the outlets.

9. Apparatus for effecting screening of a suspension, comprising: an annular substantially flat plate screen; a closed chamber; means for stationarily mounting said annular screen within said chamber; an inlet to said chamber substantially concentric with said annular screen; an outlet from said chamber on the opposite side of the said screen from said inlet; a disk comprising first and second faces, said first face having a plurality of vanes mounted thereon and extending generally radially therealong, at least some of said vanes including an end portion disposed radially outwardly from said disk periphery; means for mounting said disk for rotation in said chamber with said disk substantially parallel to said screen and said vanes spaced a small axial distance from said screen so that said vanes move suspension over said flat plate screen; a rejects outlet extending radially outwardly from said chamber and adjacent the periphery of said disk; means for rotating said disk at a speed sufficient for it to effect fluidization of suspension at the screen area as the suspension is being moved over the screen area by the disk vanes; and the disk being mounted in juxtaposition to the screen, and in cooperation with the inlet and outlets, so that the volume of suspension to be fluidized at the screen area is relatively low; and a plurality of impeller blades mounted on the second face of said disk, and extending generally radially, said impeller blades being fewer in number and/or of less radial extent than said vanes.

10. Apparatus as recited in claim 9 further comprising: means for recirculating a portion of reject material from the second face of the disk to the first face thereof, said means comprising means defining a plurality of openings in said disk adjacent the center thereof.

11. Apparatus as recited in claim 9 wherein said screen is substantially vertical, and wherein the axis of rotation of said disk is substantially horizontal, and wherein the inlet has a cross-sectional area larger than the combined cross-sectional areas of the outlets.

12. Apparatus for screening a suspension, comprising: a first chamber; a first substantially flat plate screen; means for mounting said first screen stationarily in said first chamber; a suspension inlet to said first chamber; a suspension outlet from said first chamber; a rejects outlet from said first chamber; a first disk; means for mounting said first disk for rotation within said first chamber, and so that it is substatially parallel to said first screen; a second chamber; a second substantially flat plate screen; means for stationarily mounting said screen in said second chamber; a suspension inlet into said second chamber, said suspension inlet in communication with said suspension outlet from said first chamber; a suspension outlet from said second chamber; a rejects outlet from said second chamber, said rejects outlet from said second chamber being in communication with said suspension inlet to said first chamber; a second disk; and means for mounting said second disk within said second chamber so that it is substantially parallel to said second screen, and for rotation within said second chamber; said first and second substantially flat plate screens being substantially vertical, and said first and second disks each being rotatable about a substantially horizontal axis.

* * * * *